July 8, 1969  J. E. BROOKSHIRE  3,454,738
METHOD OF ELECTRICAL DISCHARGE MACHINING
Filed March 22, 1967  Sheet 1 of 2
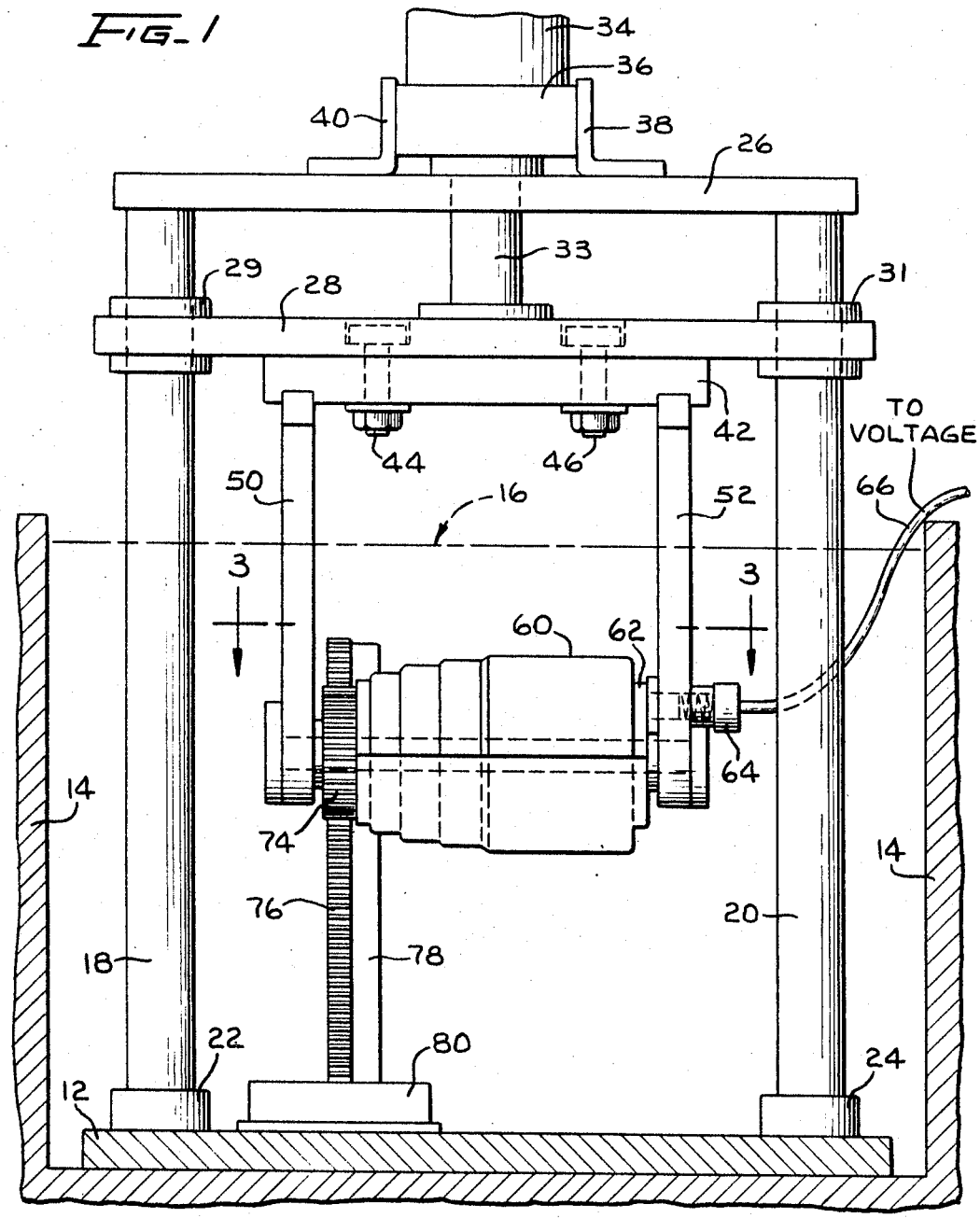
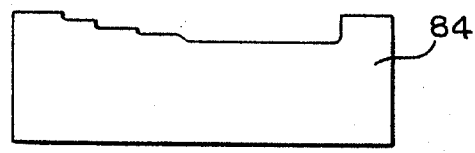
INVENTOR
J. E. BROOKSHIRE
BY A. C. Schwarz, Jr.
ATTORNEY

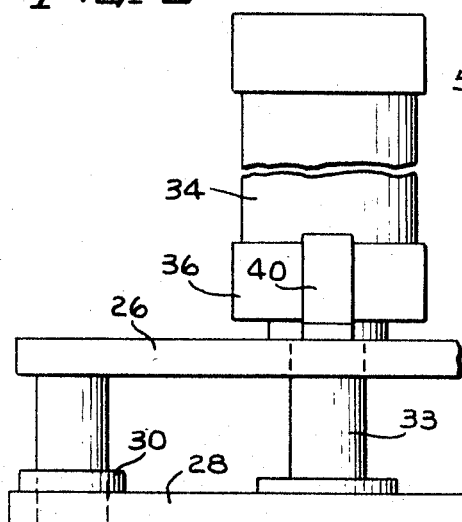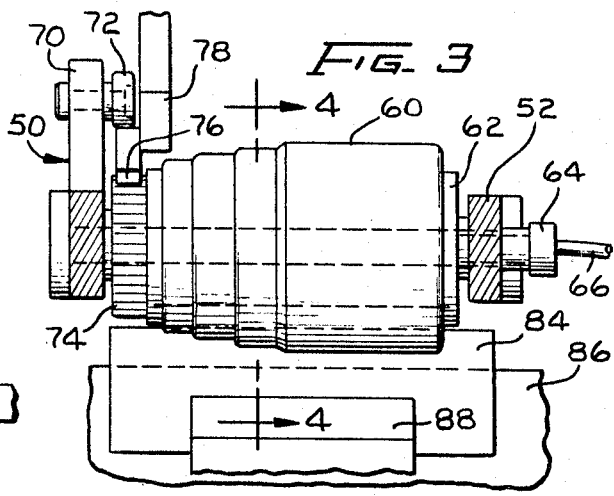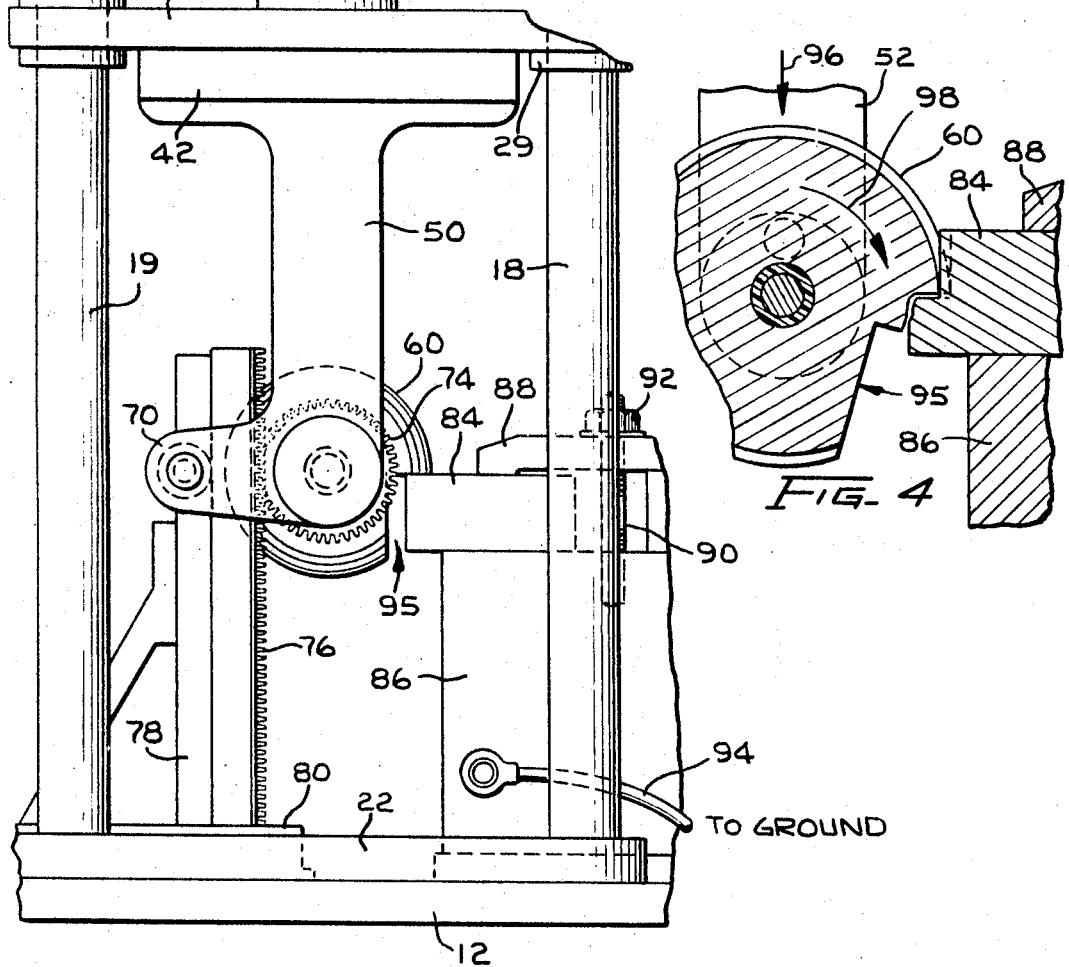

though a technique similar to that shown in FIG. 4 can also be employed.

United States Patent Office 3,454,738
Patented July 8, 1969

3,454,738
METHOD OF ELECTRICAL DISCHARGE MACHINING
John E. Brookshire, Oklahoma City, Okla., assignor to Western Electric Company, Incorporated, New York, N.Y., a corporation of New York
Filed Mar. 22, 1967, Ser. No. 625,198
Int. Cl. B23k 9/12
U.S. Cl. 219—69                                    2 Claims

ABSTRACT OF THE DISCLOSURE

A method of electrical discharge machining wherein an inverse of the desired profile to be cut into the workpiece is formed on the periphery of a circular tool that has a longitudinal groove in its surface in matingly interfering relation with the workpiece to a depth equal to the depth of cut to be made. As the tool and workpiece erode at the gap between them, the tool is moved translationally with respect to the workpiece and is also rotated to bring uneroded areas of the tool into the gap to assure that the workpiece is cut with exactly the profile on the tool. Each area of the tool passes the workpiece only once.

BACKGROUND OF THE INVENTION

Field of the invention

The present invention relates to electrical discharge machining and more particularly to a novel method of electrical discharge machining using a rotating electrode.

Description of the prior art

In electrical discharge machining, a prismatic electrode or tool is commonly advanced toward a workpiece that is immersed in a bath of dielectric fluid, and a minute, fluid-filled gap is maintained between the tool and the workpiece. High-frequency, unidirectional pulses of electrical energy are made to jump across the gap between the tool and the workpiece, eroding both of them. The polarity of the energy pulses is chosen such that erosion occurs preferentially at the workpiece; but the shape of the tool is also changed by electrical erosion.

In addition, as the tool advances past the workpiece, a small gap usually exists between the tool and finished portions of the workpiece. The dielectric fluid which surrounds the tool and workpiece and fills the gap between them contains small granules of metal which are the products of erosion and which effectively reduce the gap between these finished areas of the workpiece and the tool. This causes further erosion to occur at finished areas of the workpiece. Therefore, a workpiece cut with a linear or prismatic electrode normally develops a machined edge that has a slight taper.

Another method of electrical discharge machining uses a mechanism which is similar to a grinder in that the tool is a spinning metallic wheel. The workpiece is mounted on a movable table that is slowly advanced toward the spinning wheel, maintaining a spark gap at which erosion takes place. The periphery of the wheel can be preformed into any desired shape and the workpiece is cut to this shape. However, the periphery of the spinning wheel also erodes and the profile that has been formed into it is degraded. Therefore, those portions of the workpiece that are cut first have a sharper and more accurately cut profile than those areas of the workpiece that are cut later.

SUMMARY OF THE INVENTION

An object of the present invention is to machine a workpiece by electrical erosion and to maintain an accurate profile on that portion of the tool in the gap between the tool and the workpiece, and to maintain an extended gap between the tool and the finished portions of the workpiece.

In accordance with the preferred embodiment of the present invention as applied to an electrical discharge machining device in which unidirectional pulses of electrical energy are passed through a minute gap between a workpiece and a tool having a profile representative of the profile desired to be cut into the workpiece, there is a relative translational movement between the workpiece and the tool and a rotational movement of the tool through a substantially angular increment less than one revolution during the machining of the workpiece.

BRIEF DESCRIPTION OF THE DRAWINGS

FIG. 1 is a partial front view of a machining device with the dielectric fluid removed but with the tank for holding the dielectric fluid shown in cross section and with the workpiece removed but with the tool electrode in place;

FIG. 2 is a side view of the device shown in FIG. 1 with the tank and dielectric liquid removed but with the tool and workpiece in place showing the initial position of the tool;

FIG. 3 is a cross sectional view taken along line 3—3 of FIG. 1 which shows a top view of the tool and workpiece;

FIG. 4 is a cross sectional view taken along line 4—4 of FIG. 3 and shows an example of the extent of the erosion of both the workpiece and the tool at a point at which machining of the workpiece is approximately one-half finished; and FIG. 5 is on the same sheet as FIG. 1 and shows the finished workpiece having the profile machined into it by the tool.

DETAILED DESCRIPTION

Referring now to the drawings and more particularly to FIGS. 1 and 2, there is shown in FIG. 1 a bed 12 that rests on the bottom of a tank 14. The tank is normally filled to a level indicated by a dotted line 16 with any one of the many dielectric fluids commonly used as the dielectric environment in an electrical discharge machining process. Four columns (three of which 18, 19, and 20 are shown in FIGS. 1 and 2) rest on two elongated feet 22 and 24 that are attached to the base 12. A cap 26 is supported on top of the four columns and a ram 28 is slidably mounted on four bearings (three of which 29, 30, and 31 are shown in FIGS. 1 and 2) that surround the four columns. A rod 33 connects the ram 28 with a servomotor 34 which raises and lowers the ram. A collar 36 is firmly attached to the servomotor 34 and is fastened to the cap 26 by two brackets 38 and 40.

A plate 42 of insulating material is fastened to the ram 28 by two bolts 44 and 46, and two bearing brackets 50 and 52 are suspended from the insulating plate 42.

A circular metallic tool 60 formed with a profile that is the inverse of the profile to be cut into a workpiece is rotatably mounted in the two bearing brackets and carries a commutator disc 62 which cooperates with a wiper brush assembly 64 to connect the tool 60 through a cable 66 to a source of unidirectional pulses of energy (not shown). The energy source can be any one of the many such sources presently available to provide the electrical power for an electrical discharge machining device.

Referring now to FIGS. 2 and 3, an arm 70 extending from the bearing bracket 50 carries a roller 72 that holds a gear 74 that is firmly attached to the tool 60 into engagement with a rack 76 which is held upright by a post 78 projecting upward from an insulating foot 80 that is mounted to the bed 12. As the ram 28 is driven downward by the servomotor 34 and the rod 33, the tool 60 is also carried downward and rotates clockwise (FIG. 2) within the bearing brackets 50 and 52 by the action of the gear 74 on the rack 76.

A workpiece 84 (FIG. 2) is mounted on a conductive block 86 that is attached to the bed 12. The workpiece is held to the block 86 by a clamp 88 that is pulled downward by a stud 90 and a nut 92. A cable 94 connects the block 86 to the common or ground terminal of the energy source (not shown).

Initially, the tool 60 and the workpiece 84 are arranged as shown in FIG. 2 with a grooved cut-out portion 95 in the tool 60 providing access for the workpiece 84. The workpiece and the tool overlap or are in an interfering positional relationship as the tool 60 is moved towards the workpiece. The amount of interference between the workpiece and the tool is equal to the depth of the cut to be made in the workpiece. This is best shown in FIG. 3 wherein the overlapping or interfering engagement of the tool and the workpiece will cause a contour to be cut into the workpiece that corresponds with the contour that has been formed on the periphery of the tool 60.

A small, fluid-filled gap is maintained between the tool and workpiece and unidirectional pulses of electrical energy are supplied between the cables 66 and 94. An arc across this gap causes electrical erosion of both the tool and the workpiece, but the polarity of the unidirectional pulses of energy is chosen to produce a preferential erosion of the workpiece.

As the tool and workpiece erode, metallic particles of both workpiece and tool material are flushed from the gap by movement of the dielectric fluid.

The erosion causes the gap to widen, increasing the electrical potential necessary to cause an electric arc to jump across the gap. This is recognized by circuitry in the energy source in a manner common in the art of electrical discharge machining and operates the servomotor 34 to drive the rod 33 and the ram 28 downward a small amount.

As erosion further progresses, the ram 28 carries the tool 60 further downward as shown by arrow 96 in FIG. 4. The cooperation of the gear 74 and the rack 76 causes the tool 60 to rotate clockwise (FIG. 4) as shown by an arrow 98. It can be seen from FIG. 4 that the major portion of the erosion of the tool takes place in the body of the tool 60 between its periphery and the axis about which it rotates and that the depth of this erosion in the tool 60 is approximately equal to the depth of the cut made in the workpiece. Only the final contour cut into the workpiece 84 is made by erosion of the periphery of the tool 60; whereas in the grinder configuration, all of the erosion of the tool occurs at its periphery, thereby degrading any profile formed on it. It can further be seen that as erosion progresses through the workpiece 84 a new and uneroded portion of the periphery of the tool 60 is always available to form the final profile of the workpiece. In addition, the curvature of the tool 60 gives rise to a large gap between the workpiece and the tool at those portions of the workpiece that have already been machined, thereby preventing the erosion products suspended in the dielectric fluid from reducing the effective distance of the dielectric gap sufficiently to facilitate further erosion of the finished areas of the workpiece.

FIG. 5 is a top view of the workpiece after electrical discharge machining has been completed and shows the accuracy with which the profile on the tool 60 is cut into the workpiece.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A method of electrical discharge machining of a profile into a workpiece, using a rotatable tool having a longitudinal groove in the periphery of the tool parallel to the axis of rotation of the tool, the tool also having a representation of the desired profile on its periphery, comprising the steps of:

initially positioning the workpiece within the longitudinal groove in the tool for providing an initial interference of at least a portion of the workpiece and a cross section defined by a radial plane of the tool, by an amount equal to the depth of the cut to be made into the workpiece;

forming a minute gap between the tool groove and the workpiece;

passing unidirectional pulses of electrical energy through the gap;

causing a relative translational movement between the workpiece and the tool; and rotating the tool through a substantial angular increment but less than one revolution during the machining of the workpiece in response to the relative translational movement between the workpiece and the tool.

2. A method according to claim 1 wherein the depth to which electrical erosion occurs in the workpiece is substantially equal to the depth to which the workpiece is initially positioned within the longitudinal groove in the tool.

References Cited

UNITED STATES PATENTS

| | | | |
|---|---|---|---|
| 2,974,216 | 3/1961 | Inoue | 219—69 |
| 3,125,664 | 3/1964 | Pfau | 219—69 |

ANTHONY BARTIS, *Primary Examiner.*

R. F. STAUBLY, *Assistant Examiner.*

U.S. Cl. X.R.

204—143